United States Patent [19]
Greene

[11] 3,913,697
[45] Oct. 21, 1975

[54] VEHICLE HAVING A POWER TAKE-OFF AND A HYDRAULIC MOTOR, AND METHOD OF DRIVING SAME

[76] Inventor: Clarence Kirk Greene, Arlington Apartments, Apt. 12 J, 100 N. Arlington Ave., Reno, Nev. 89501

[22] Filed: June 3, 1974

[21] Appl. No.: 475,655

Related U.S. Application Data

[63] Continuation-in-part of Ser. No. 342,219, March 16, 1973.

[52] U.S. Cl. .......................... 180/14 A; 180/44 M
[51] Int. Cl.² ................................... B62D 59/04
[58] Field of Search .... 180/14 R, 14 A, 14 B, 14 D, 180/44 M, 66 R; 74/710.5

[56] References Cited
UNITED STATES PATENTS

| | | | |
|---|---|---|---|
| 2,228,581 | 1/1941 | Olen | 74/710.5 |
| 2,913,061 | 11/1959 | Beyerstedt | 180/66 R X |
| 3,227,235 | 1/1966 | Budzich | 180/14 A |
| 3,320,829 | 5/1967 | Cull | 180/66 R X |
| 3,354,978 | 11/1967 | Budzich | 180/44 M |
| 3,361,223 | 1/1968 | Bauer | 180/44 M |
| 3,430,722 | 3/1969 | Budzich | 180/44 M |
| 3,447,619 | 6/1969 | Nodwell | 180/66 R X |
| 3,557,634 | 1/1971 | Bixby | 74/710.5 |
| 3,584,698 | 6/1971 | Larson | 180/14 A |
| 3,612,202 | 10/1971 | Moon | 180/14 A |

*Primary Examiner*—David Schonberg
*Assistant Examiner*—Terrance L. Siemens
*Attorney, Agent, or Firm*—Oswald H. Milmore

[57] ABSTRACT

Vehicle means, such as a truck-and-trailer combination, has an engine coupled to a power take-off unit, such as a torque divider which has one output drivingly, preferably mechanically, coupled to a primary driving element, e.g., the truck wheels, and a second output coupled to a variable-displacement pump which is connected by ducts to a motor drivingly coupled to a secondary driving element, e.g., the trailer wheels. A by-pass valve advantageously interconnects said ducts. The torque divider may be a power take off device or may have differential action; in the latter case it may include clutch means for driving the primary driving element directly, eliminating differential action. A second clutch may optionally be provided to disconnect the hydraulic motor from the secondary driving element. By altering the relative displacements of the pump and motor the power distribution can be changed. The pump displacement may be adjusted to equalize substantially or bring to a desired ratio the pressures in the pump supply and return ducts, e.g., with the aid of visible pressure gages on the ducts and a manually controllable displacement changer. A leakage return line from the motor to the pump is advantageously provided. In the method, the pump displacement is adjusted to balance the pressures in the ducts, and the motor is driven only when the ratio of the ground speeds of the truck and trailer wheels is altered.

22 Claims, 5 Drawing Figures

VEHICLE HAVING A POWER TAKE-OFF AND A HYDRAULIC MOTOR, AND METHOD OF DRIVING SAME

This is a continuation-in-part of my application Ser. No. 342,219, filed Mar. 16, 1973.

The invention relates to vehicle means, such as a single vehicle or a truck-and-trailer combination, having a vehicular power plant and with a power take-off unit, such as a torque divider having one output thereof coupled to drive a primary driving element, as the wheels on a truck, and a second output coupled to drive a pump which is hydraulically connected to drive a hydraulic motor which is, in turn, drivingly coupled to a secondary driving element, as the wheels on a trailer. It further relates to a method of driving such a vehicle means.

The torque divider may but need not have differential action, and the pump may have a fixed or a variable displacement. Speedchanging and/or reversing gears may be present, being preferably situated between the power plant and the torque divider.

THE PROBLEM

Prior attempts to distribute the driving power or torque from the vehicular engine among several ground-engaging driving elements situated on different transverse axes (as well as delivering power in reverse, using the engine as a brake) have led to difficulties. Among these are the complexity of prior systems to effect the desired distribution of driving torques and the inability of prior systems to provide an economically constructed and dependable mechanism. This difficulty has been especially acute in truck-and-trailer combinations, wherein both the truck and the trailer are, under some conditions, driven or both deliver power to the engine.

It is desirable to produce driving (or retarding) forces on the secondary driving elements, such as the wheels on a trailer or an added axle on the truck of a single vehicle, under certain operating conditions sufficiently great to advance the vehicle means, as when starting, when traction to the ground is poor, when operating in reverse, or when decelerating or descending a long grade. But when the vehicle is on firm ground and/or moving forwardly at a more or less constant speed, as on approximately level road, the driving force through the primary driving element, as the mechanically driven wheels on the truck, is adequate and the efficiency of the drive system is improved by reducing or eliminating the supply of power to the secondary driving element through a hydraulic system, making the secondary driving element free-wheeling.

A further difficulty in prior drive systems is the complexity and their virtual or complete inability to apply driving (or retarding) force to the secondary driving element automatically. It would be desirable to apply a driving connection — either to supply power or to accept power — to the secondary driving element through hydraulic means immediately when the ground speed ratio of the secondary to the primary driving elements is altered. Advantageously, this connection is automatic, without any action on the part of the operator of the vehicle means.

When a driving torque is applied to both the primary and the secondary driving elements, it should, under normal conditions, preferably be applied in a predetermined, constant ratio, such as 60–40 (40 percent of the torque going to the secondary driving element or trailer wheels) or in any other desired ratio, such that 30 to 75 percent goes to the secondary driving element, especially when several secondary driving elements are situated on separate transverse axes, as on one or on several trailers. Such a constant ratio is desirable regardless of the speed of the engine or its power output or power-absorbing capacity. The ratio may be different when the engine absorbs power. However, under certain operating conditions it is desirable to alter this ratio, especially to maintain the draw-bar tension or to place it into only a limited compression, thereby to minimize the danger of jack-knifing of the truck-and-trailer combination.

The expression "differential action" is herein used to describe or denote the relationship of the input to the two outputs of the torque divider such that, if the input is held stationary, a forward torque applied to one output applies a torque tending to turn the other output backwards. Such a differential action permits a constant ratio of torque distribution, as well as a constant ratio of power distribution so long as the speed relationship between the two outputs of the divider remains unaltered. But, since power is equal to the product of torque and speed, it is evident that a change in the last-mentioned relationship will result in a change in the power distribution.

Differential action in the torque divider is, moreover, often desirable in many embodiments because of other factors, such as the unequal lengths of the paths followed by the primary and secondary driving elements, as in rounding a curve, or fortuitous changes in the effective wheel diameters caused, e.g., by tire wear or by the degree of tire inflation.

A special difficulty is encountered in drive systems having a variable displacement pump driving a motor and driven by a torque divider having no differential action, or a differential torque divider which has a clutch engaged to drive the primary output directly and, hence, has no differential action, wherein the pump is driven at a speed having a constant ratio to the speed of the primary output, the pump being coupled to the motor (usually on the trailer) by ducts, the motor being drivingly coupled to the secondary driving element (also usually on the trailer). In such a system the torque divider is coupled, usually mechanically, to the primary driving element. Unless the displacement of the pump is adjusted correctly, such a system causes a great difference in the pressures within the ducts, to the extent that (even allowing for leakage, as is explained below) the wheels skid or cause loss of power, as by the operation of a relief valve. It is assumed, in the foregoing, that a by-pass valve interconnecting the pump's output and inlet ports, if provided, is closed. It is important in this situation to adjust the pump displacement to cause the difference in the pressures in the ducts to be zero or approximately zero, i.e., to adjust the displacement to balance the pressures.

Any great deviation of the pump displacement from the proper value, according to the foregoing paragraph, results in differences in pressures, which cause the ratio of speeds of the primary to that of the secondary driving element to change or try to change, resulting in skidding and/or great tire wear. This is true both when the trailer wheels are driven against the ground more slowly or more rapidly than the truck wheels. (Small speed differences, e.g., due to the shorter path of the trailer wheels in rounding a curve, are, according to the invention, taken care of by leakage of hydraulic fluid from one or the other of the ducts within the pump or motor, as is explained hereinafter.) The correct setting of the pump displacement was found to be critical to the efficiency of the drive system and the tire wear, and the prior proposals did not provide any means for such a correct adjustment of the pump displacement.

The hydraulic connection of the vehicular power plant to the secondary driving element, especially when it is one or more trailer wheels, is also highly desirable for reducing the danger of jackknifing, since such a connection permits the compressive force on the trailer draw-bar to be reduced, advantageously placing the drawbar into tension. The expression "reducing the compressive force on the draw-bar," as used herein, includes placing the draw-bar into tension. Prevention of jack-knifing is especially important when a truck-and-trailer combination is retarded, and reduction in the draw-bar compressive force is useful also when the combination is descending a grade and when backing up. But a hydraulic connection to the trailer is not always needed when the combination is travelling on a road affording good traction, especially when approximately level, and the efficiency of the drive system would be greatly improved if no or almost no power were transmitted through the hydraulic system under these conditions.

OBJECTS

According to one aspect, a principal object is to provide a method of driving a vehicle means by applying power hydraulically to the secondary driving element substantially only when the ratio of the ground-engaging speeds of the primary and the secondary driving elements is altered (from the condition in which both elements are moved forwardly on approximately level road affording good traction), the primary driving element being on the truck.

According to another aspect, a principal object is to provide a drive system for self-propelled vehicle means having a power plant and a power take-off unit, usually embodied in some conditions as a torque divider which distributes the torque from the vehicular power plant (or, upon deceleration or braking, to the power plant) to the primary driving element and to a pump which is coupled by ducts to a motor which is drivingly coupled to the secondary driving element, wherein:

a. The hydraulic power to (or from) the secondary driving element is substantially nil save when the ratio of the ground-engaging speeds of the primary and secondary driving elements differs from the ratio of the said speed which prevails when the vehicle means is moving forwardly on road affording good traction, or b. the vehicle means has a torque divider which differentially divides the torque between the primary and the secondary driving elements.

Another object, attained in certain embodiments only, is to provide a drive system for such a vehicle means which includes a power take-off unit, usually embodied as a torque divider, which may or may not have differential action, e.g., at the option of the vehicle means operator, and the divider has an input shaft coupled to the vehicular power plant and two output shafts of which one is coupled, preferably mechanically, to the primary driving element, such as the truck wheels, and the other of which is rotationally coupled to the input shaft of a pump which may be of fixed but is preferably of variable displacement, said pump being connected by duct means to a driven hydraulic motor which is coupled rotationally to drive the secondary driving element, e.g., the wheels of a trailer, the drive system being constructed to permit the pump to transmit, under normal conditions, no power and to receive no power from the secondary driving element (via the momtor), but capable of supplying power to, or receiving power from, the secondary driving element under abnormal conditions, as when the ratio of the ground speeds of the primary and secondary driving elements is altered. Additional objects are:

To provide a drive system for a self-propelled vehicle means of the kind described above which includes a variable-displacement pump interconnected by ducts to a hydraulic motor, the motor being drivingly coupled to the secondary driving element, the system having means for varying the pump displacement, said means being suitable for fixing the relationship of the pressures in the said ducts.

Ancillary to the foregoing, to provide a drive system having visible means for indicating, e.g., to the operator of the vehicle means, the relationship between the pressures in the ducts interconnecting the variable-displacement pump and the hydraulic motor, to permit the pump displacement to be adjusted so as to bring the pressures in said ducts approximately to equality or to a desired relationship.

To provide a power take-off unit, usually a drive system for a self-propelled vehicle means of the kind described above which includes a differential torque divider, having a first output shaft rotationally coupled to drive a primary driving element, and a second output shaft rotationally coupled to drive a fixed- or variable-displacement pump, the pump being connected by ducts to a hydraulic motor which is coupled to drive the secondary driving element, the motor and the secondary element being optionally on the trailer, wherein the power distribution between the two output shafts can be varied when the pump has a variable displacement and a desired proportion of the power can be delivered to or received from one driving element.

Additional object will be apparent from the following description.

SUMMARY

The vehicle means, carrying a power plant and having primary and secondary driving elements situated on different transverse axes, includes a power take-off unit which usually includes a torque divider, with two outputs of which one is coupled, preferably mechanically, to the primary driving element and the other is coupled to drive a pump connected by ducts to a hydraulic motor which is, in turn, drivingly coupled to the secondary driving element. According to alternative embodiments (which may, if desired, be included in the same construction):

A variable displacement pump having means for altering the displacement is used, gage means for indicating the relationship of the pressures in the ducts are provided, and the torque divider is incapable of differential action (being either a power take off device or a differential torque divider with a clutch which is set to prevent differential action). The pump displacement is adjusted to make the pressures approximately equal (when moving on an approximately level road affording good traction), whereby substantially no power is delivered hydraulically to the secondary driving element (trailer wheels) so long as the primary and secondary driving elements turn at the same speed.

Alternatively, a pump of either fixed or variable displacement is used with a torque divider having differential action, the divider including a clutch for selectively interconnecting the input shaft with the output shaft which is coupled to the primary driving element; the other output shaft and pump may be but need not be driven from the input shaft when the clutch is engaged.

A by-pass valve interconnecting the pump inlet and outlet ports, as through the interconnecting ducts, controllable by the vehicle operator, is preferably provided, particularly to permit the pump displacement to be out of proper adjustment when no differential action in the torque divider is possible.

In the differential divider, there may be a planet carrier carrying planet gear means meshing with two other gears. In one specific embodiment the carrier is rotationally fast to the input and the planet gears mesh with an internal gear and with a sun gear which are, respectively, rotationally fixed to the first and second outputs. The various gears may be of any type, such as gears having peripheral teeth, bevel gears, etc. The gears, such as the planet gears, may be single or composite, that is, consisting of several gears of different pitch diameters and relatively non-rotatable.

A transmission, which may include a clutch and/or speed-changing as well as a reversing gear, is usually provided and is, according to an aspect of the invention, preferably situated between the vehicular power plant and the input shaft to the torque divider. Thereby the ratio of the speeds of the primary driving element and the pump input shaft is constant, regardless of the speed or directional relation of the power plant to the divider input shaft.

There need be only one hydraulic motor for the secondary driving element (e.g., consisting of several wheels on one or more transverse axes, as on the trailer, driven by differential gears) or a separate motor may be provided for each driven wheel. When several motors are used, they are preferably connected in parallel to permit rotations at different speeds, or other means for driving several wheels from one or more motors may be provided.

When the pump has a variable displacement and no differential action is possible in the torque divider, the displacement is adjusted to balance, e.g., to bring into substantial equality, the pressures in the ducts, the displacement being often critical. Any great difference in the pressures in these ducts causes skidding or loss of power by operation of a relief valve. But if neither skidding nor operation of the relief valve occurs there is no loss of power. Small differences in the ground speeds of the primary and secondary driving elements, for example, caused by the traversing of a secondary element on a trailer of a shorter path upon rounding a curve, are taken care of by leakage within the motor from a duct at a higher pressure into collecting means connected to means, including an auxiliary pump, for returning leaked hydraulic fluid to the hydraulic system, e.g., including a third duct.

When the motor is driven by the secondary driving element it pumps fluid to the pump which acts, through the torque divider, on the power plant to cause a braking action. Setting the pump, if of variable displacement, to the correct displacement is important, both when differential action in the torque divider is and is not possible, but especially in the latter case. In the latter, the pressure difference between the ducts, inherently causing a rise of pressure in the return duct, is brought to within operational bounds by proper adjustment of the displacement; in the former case, the adjustment causes the correct absorption of power by the plant, in a fixed relationship to the power supplied by the primary driving element.

The by-pass valve, when provided and open, permits the pump and the hydraulic motor to turn independently without the transmission of hydraulic power. Since the pump and motor turn in the same direction, only a small part of the hydraulic fluid flows through this open by-pass valve, and it may therefore have a size smaller than that necessary to carry the maximum flow from the pump. When the pump displacement is not matched, e.g., when it is set to a low or to zero displacement, most or all of the fluid flow caused by the motor goes through the by-pass valve, avoiding skidding, etc., and reducing wear on the pump, especially when the pump continues to be driven by a differential torque converter having the clutch engaged.

A disconnecting clutch is, however, optionally provided between the hydraulic motor and the secondary driving element, which, when open, prevents rotation of the motor and, hence, the pumping of hydraulic fluid.

A change in the relative displacements of the pump and the motor, as by a displacement change in a variable displacement pump, changes the speed ratio of the secondary driving element relatively to the primary driving element; hence the ratio of the powers delivered to or absorbed from these driving elements is altered. To permit a smooth engagement of the clutch in a differential torque divider equipped with such a clutch, it is desirable that the input shaft and the clutch-coupled output shaft turn at a common speed when the clutch is engaged. Such sameness of speeds can be attained by designing the gears and relative displacement ratio of the pump and motor (using a fixed-displacement pump) or by setting the displacement (using a variable displacement pump or motor) to the correct value. While a speed-equalizing means, such as a friction clutch, may be used, normally the speeds can be controlled to make a simple dog clutch suitable.

The expression "normal displacement" is used herein to denote the relationship of the pump and motor displacements with which, when the primary and secondary driving elements are moving at a common ground speed: in a differential torque divider, the input shaft and the clutch-coupled output shaft rotate at a common speed; and in a drive system wherein no differential action is possible, the pressures in the ducts from the pump are substantially equal. In both conditions, movement on a straight road providing good traction is assumed.

DRAWINGS

The accompanying drawings show certain preferred embodiments by way of illustration, wherein.

FIRST EMBODIMENT

Figure 1:
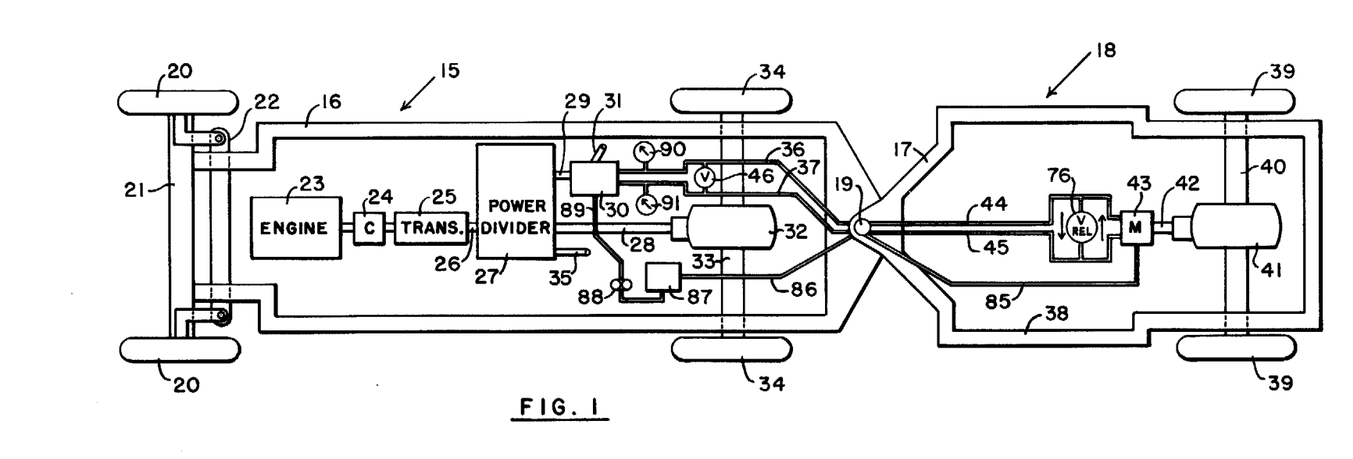
FIG. 1 is a schematic plan of a truck-trailer combination having a torque divider and a drive system according to the invention.
Figure 2:
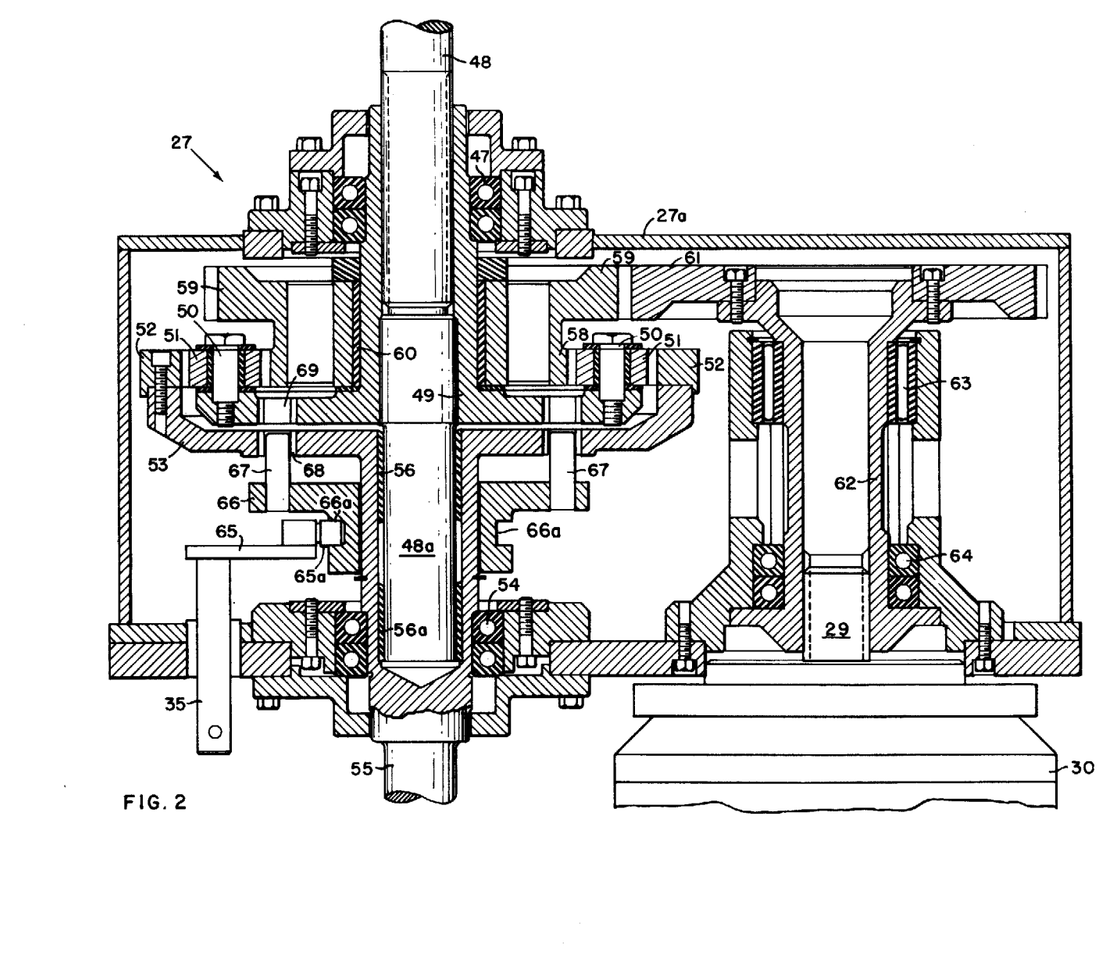
FIG. 2 is a longitudinal section through a differential torque divider according to a first embodiment.

Referring to FIGS. 1 and 2, there is shown a truck or tractor 15 having a chassis 16 supporting at its rear a draw-bar 17 of a trailer 18, illustrated as a semi-trailer although this is not restrictive of the invention, which trailer is coupled to the truck by a fifth wheel 19. The truck has steerable front wheels 20, interconnected by an axle housing 21 and provided with steering mechanism indicated generally at 22. The truck carries a power plant 23, such as an internal combustion gasoline or diesel engine or turbine engine, etc., which is connected through a clutch 24 and a transmission gear box 25 (which may include a reversing gear) to the input shaft 26 of a torque divider 27, illustrated in this embodiment as having differential action under certain conditions. The divider has two output shafts, namely, a coaxial or first output shaft 28 and a second shaft which has an annular gear and includes the gear 59; the latter gear is rotatable about the axes of the input and first output shafts and is geared to the input shaft 29 of a pump 30, which is preferably of the positive displacement type. This pump may be either of fixed or of variable displacement and, if the latter, has a lever 31 for controlling the displacement. The pump may be of any suitable construction and may include swash plates capable of adjustment to various tilts, controlled by the lever 31.

The action of the lever on the pump displacement may be mechanical, but is often connected to the pump by hydraulic means, wherein hydraulic fluid positions the tilt or angle of the swash plate. When the construction of the pump is such that the absence of pressure on the hydraulic fluid causes the pump displacement to be zero or near zero, it is desirable to pressurize this fluid before the pump rotates, as by coupling the auxiliary pump which pressurizes such fluid to a shaft driven by the vehicular power plant 23, either ahead or after the transmission 24-25. This is not necessary, although it is desirable, when a by-pass valve 46 (described hereinafter) is provided.

The shaft 28 is coupled, preferably mechanically, to the input of the truck differential gear unit 32, which drives axles located within housings 33 connected to the primary driving element, i.e., the rear truck wheels 34. The torque divider includes an axially shiftable control rod 35 which, when pushed in (toward the left as seen in FIG. 1 and upward as seen in FIG. 2) mechanically interlocks the input shaft 26 and the output shaft 28, for driving the truck wheels 34 directly from the truck power plant. The pump 30 has a high-pressure supply duct 36 and a return duct 37, which ducts are coupled to corresponding ducts 44 and 45 on the trailer by suitable means, such as connection in the fifth wheel 19, e.g., as suggested in FIGS. 2 or 3 of my copending U.S.A. patent application Ser. No. 298,366, filed Oct. 17, 1972, now U.S. Pat. No. 3,817,341, issued June 18, 1974.

It will be understood that the hydraulic system in practice includes numerous auxiliary devices, such as a reservoir for hydraulic fluid, auxiliary pump means for returning drained or leaked fluid to or from the reservoir and for pressurizing the hydraulic system, and relief valves, etc., which are well known and not a part of the invention; only the relief valve means 76, the sump 87, the auxiliary pump 88 and the return duct 89 are shown.

The trailer includes a chassis 38 and a pair of driving wheels 39, driven by axles contained within a housing 40 from a differential gear unit 41 having an input shaft 42. A hydraulic motor 43, suitably secured to the chassis 38, is mechanically coupled to the input shaft 42 and is connected to the pump 30 by first and second ducts 44 and 45 which connect the motor to the pump. This motor may permit some hydraulic fluid from these ducts, especially in the third embodiment, to escape to a sump which is connected to a third duct 85, connected through the fifth wheel 19 to a third duct 86 on the truck, for delivering the fluid to a sump 87. An auxiliary pump 88 returns the hydraulic fluid to the hydraulic system through a duct 89. It may be noted that the sump 87 may also, in some embodiments, receive leaked hydraulic fluid from the pump or the swashplate control mechanism, and that the duct 89 may be connected to pressurize the swash plate control system.

A by-pass valve 46, controllable by the operator of the vehicle means, interconnects the pump ports, as through the ducts 36 and 37. This valve is optional, but is very useful, especially in the third embodiment (described below) or when the clutch (also described below) is set to permit no differential action in the torque divider.

Gages 90 and 91, located to be visible to the operator of the vehicle means in his compartment, are connected to the ducts 36 and 37, and indicate the pressures in these ducts. It will be understood that other suitable means, connected to these ducts, for indicating the relationship of their pressures, may be substituted.

Referring to FIG. 2, the torque divider, if having in one mode of use differential action, may comprise a housing 27a, secured to the chassis 16 and having bearings 47 for rotatably mounting an input shaft 48, which is coupled rotationally to the shaft 26 or is integral therewith. The shaft 48 has splined thereto a disc or planet carrier 49, which has mounted thereon a plurality, such as three, spindles 50, each carrying a planet gear 51 which is freely rotatable on the carrier. The radially outer parts of these planet gears (away from the axis of the input shaft) mesh with an internal gear 52, which is bolted to a plate 53; this plate is rotatably mounted to the housing 27a by bearings 54, which afford both radial and axial support and have their inner races fixed to an output shaft 55 which is shown to be integral with the plate 53. Shaft 55 is coaxial with the input shaft 48; the latter has a reduced end 48a. This end part may be separate, splined or otherwise rotationably secured to, the carrier 49, and is radially supported by bushings 56, 56a within the shaft 55.

The radially inner parts of the planet gears 51 mesh with a sun gear 58 which is fixed to, e.g., integral with, a larger-diameter sun or spur gear 59 constituting the other output shaft. These gears are rotationally supported by a bushing 60 from the input shaft 48 via the hub of the carrier 49. The gear 59 meshes with a spur gear 61, e.g., of the same or of a different diameter from the gear 59. The gear 61 is fast on a secondary output shaft 62 which is mounted by bearings 63 and 64 to the housing 27a. The shaft 62 is rotatably fixed, e.g., splined, to the input or driving shaft 29 of the pump 30.

The interlocking mechanism or clutch means comprises the afore-mentioned control rod 35, which is fixed to a shift arm 65 having an extension 65a, the latter being optionally a roller situated within an annular groove 66a of a ring or collar 66. This collar is axially slidable on but rotates with the output shaft 55, and has fixed thereto a plurality of axially-extending pins 67 which extend through the holes 68 in the plate 53 and are located to enter holes 69 in the planet carrier 49. When the rod 35 is pushed into housing 27a (upwards as viewed in FIG. 2) the pins 67 lock the planet carrier 49 rotationally to the plate 53 and to the coaxial first output shaft 55. No differential action in the torque divider is thereafter possible, until the clutch is again disengaged.

OPERATION OF FIRST EMBODIMENT

When the pump 30 and the motor 43 have fixed displacements and the gears have the relative sizes to cause normal displacement, the truck-trailer combination is started, especially on ground affording poor traction (e.g., by mud or ice occurring or due to loose rocks on the road, etc.) by first retracting the rod 35, and selecting a suitable (usually low) gear in the transmission 25, and placing the vehicle means into motion by engaging the clutch 24 to place the shaft 48 into motion. The torque of the power plant is thereby divided between the first output shaft 55 (or 28) and the second output shaft 29, in the ratio of the diameters of the inernal gear 52 to the sun gear 58, e.g., 60 to 40 for the dimensions shown. If the dimensions are altered, e.g., the gear ratios in the differentials 32 and 41 and the relative displacements of the pump 30 and the motor 43 are such that a normal displacement relationship prevails, the planet gears 51 do not rotate relatively to the planet carrier, causing the power to be distributed in the same ratio. The output shaft 55 then also rotates at the same angular velocity as the input shaft 48, permitting the rod 35 to be pushed in to engage the clutch without shock.

The rod 35 is pushed into the housing when the vehicle means has gained speed and/or is on ground which gives good traction; the by-pass valve 46 is then opened. The former action results in the direct drive of the output shaft 55, causing the shaft 28 to drive the differential 32 directly; the pump continues to rotate but no hydraulic power is transmitted through the ducts 36 and 37 because the by-pass valve 46 is open.

A change in the gear ratio in the transmission 25 does not alter either the torque or the power distribution to or from the divider outputs.

When a variable displacement pump is used, while the clutch is disengaged (the by-pass valve 46 being closed) any reduction or increase in the pump displacement (or an opposite change in the motor displacement, if variable) causes an increase or a decrease, respectively, in the power delivered to (or received from) the trailer, while the torque relationship of the two divider outputs is unaltered. The speed of rotation of the power plant is, in these instances, increased or decreased, respectively.

When the by-pass valve 46 is open, the pump may be set to zero displacement to avoid work by the pump and to reduce wear on the swash plates, when provided. Of course, the rod 35 is pushed in before the valve 46 is opened.

Since no differential action occurs when the clutch is engaged (the rod 35 being pushed in) with a variable displacement pump, the operation as described hereinafter for the third embodiment is applicable, and is incorporated herein by reference.

Upon deceleration, as when descending a grade, and when the descending speed is unaltered, the valve 46 is closed (or nearly so) and the rod 35 is preferably retracted. (The rod may be left in when a normal displacement relationship prevails, but may even then be retracted.) The vehicle means then drives the engine 23 in compression, the motor 43 (or 43a) acting as a pump; the truck also then transmits power to the engine. Transmission of power from the trailer reduces the danger of jack-knifing.

It is evident that the pump's maximum displacement may be equal to or may exceed the normal displacement; in the latter case, a stop or a mark is advantageously associated with the lever 31 to permit facile setting of the pump to normal displacement.

A further advantage of using a variable displacement pump is that the danger of jack-knifing upon deceleration is reduced by decreasing the pump displacement after pulling out the rod 35 to restore differential action. This causes the pump and the planet gears to rotate faster than before, turning the engine 23 faster and thereby increasing the retarding effect on the trailer. Of course, the by-pass valve 46 is closed. The pump displacement may also be similarly decreased when backing up, to place more backward power on the trailer and thereby decreasing compression in the draw-bar, usually putting it into tension.

SECOND EMBODIMENT

Figure 3:
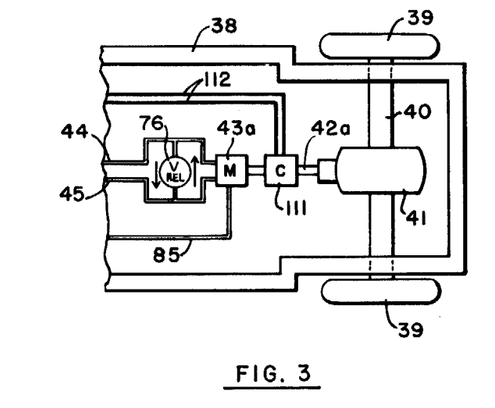
FIG. 3 is a fragmentary schematic plan of a trailer according to a second embodiment.

Referring to FIG. 3, wherein the reference numbers 38–41, 44, 45, 76 and 85 denote parts previously described, the trailer has a clutch 111, such as a friction clutch, operationally controlled from the truck's operator compartment through a hyraulic or electrical line 112. The clutch, when engaged, interconnects the hydraulic motor 43a and the drive shaft 42a of the differential gear unit 41. This clutch is engaged when the pump 30 delivers power to or receives power from the trailer wheels 39, but can be disengaged, as when the rod 35 is pushed in, thereby avoiding prolonged or rapid rotation of the motor when not needed and obviating the pumping of hydraulic fluid by the motor through the ducts 44 and 45 and the valve 46.

The relief valve 76, common to this and to the first embodiment, is preferably provided to by-pass hydraulic fluid in either direction whenever the difference in the pressures in the ducts 44 and 45 exceeds a predetermined value, such as 5,000 psi. This relief valve is especially useful to avoid shock when engaging the clutch 111, if the valve 46 is closed and/or the displacement of the pump 30 is incorrectly set.

Operation is as was previously described.

THIRD EMBODIMENT

Figure 4:
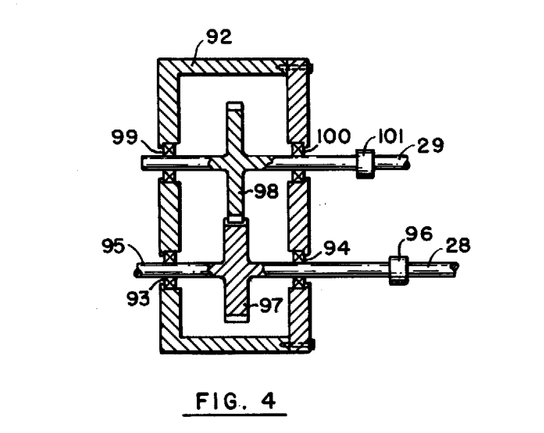
FIG. 4 is a sectional view through a part of of a power take off device which may be used as the torque divider according to a third embodiment.

Referring to FIG. 4, the torque divider, incapable of differantial action, is a power take off device, having a housing 92 secured to the chassis 16 and having bearings 93 and 94 affording radial and axial support to a shaft 95, which is the input shaft and is rotationally coupled to the shaft 26. The shaft 95 is further coupled, by a coupling 96, to drive the shaft 28, thereby driving the primary driving element (the wheels 34) mechanically. The shaft 95 carries a spur gear 97 which meshes with a spur gear 98 of the same or of a different, e.g., a larger, pitch diameter, mounted on a shaft which is journalled to the housing in bearings 99 and 100 and is coupled by a coupling 101 to the input shaft 29 of the pump 30. This pump has a variable displacement, and includes means, such as a lever 31, shown in FIG. 1, for adjusting the displacement.

The other parts of the vehicle means are as shown in FIGS. 1 or 3.

OPERATION OF THIRD EMBODIMENT

The speed ratio between the pump shaft 29 and the shaft 28 driving the truck differential is determined by the pitch diameters of the gears 97 and 98. When the pump displacement is set by hydraulic pressure caused by the rotation of the pump 30, the displacement may be incorrect, and the valve 46 may be opened to permit starting from a condition in which the vehicle means is not moving, especially on surfaced road. However, the displacement may be set mechanically, or the auxiliary pump which supplies hydraulic fluid to set the displacement may be driven from the engine or by the shaft 26; in these cases, it is not necessary to open the by-pass valve 46 initially.

The pump displacement is adjusted by the lever 31 to normal displacement, i.e., to cause the pressures displayed visibly by the gages 90 and 91 to be equal or approximately equal when the by-pass valve 46 is closed. When a great divergence from normal displacement occurs initially, the valve 46 is closed only gradually.

When the by-pass valve 46 is closed and the pump displacement has been adjusted, (which corrects for divergences in the tread diameters of the truck and trailer wheels) no hydraulic power is delivered through the ducts 36 and 37 to the motor 43 (or 43a) so long as the vehicle means travels forwardly on a straight road which affords good traction, since the pressures in these ducts are approximately equal.

When rounding a curve, the trailer wheels traverse a shorter path than the truck wheels, causing the trailer wheels to be driven forwardly by the motor. Some of this pressure difference, insufficient in most cases to activate the relief valve 76, and causing a rise in the pressure in the supply duct 36, is dissipated by leakage of hydraulic fluid within the pump, which is returned to the sump 87 through the third ducts 85 and 86. Execessive pressure results in the operation of the valve 76.

In starting forwardly, when the truck wheels 34 skid forwardly (for any cause, such as insufficient traction, encountering mud or ice, etc.) the shaft 28 turns faster than the normal speed of the shaft 29 (reckoning the ratio of the gears 97 and 98), to drive the pump 30 at an increased speed; this causes hydraulic power to be applied to the motor 43 (or 43a) and results in the driving of the trailer wheels 39. Therefore, no hydraulic power is applied when the primary and secondary driving elements have a common ground speed, but power is applied automatically to the trailer wheels when needed, as due to loss of traction to the truck wheels.

The foregoing action also occurs when the truck wheels gain on the trailer wheels, for example, when ascending on a dirt road on which the truck wheels may skid forwardly by engaging loose rocks, or when the truck wheels gain forward motion upon encountering ice or mud.

Upon descending a grade, when the brake is applied to the wheels, mainly the truck wheels, should the truck wheels skid, they will turn less rapidly than the trailer wheels (possibly stopping their rotation entirely); this causes the trailer wheels to apply power through the pump 30 and the shaft 29, braking the trailer through the gears 98 and 97 and the engine 23. The retarding effect on the trailer wheels 39 reduces the compressive force on the draw-bar 17, thereby lowering the danger of jack-knifing of the vehicle means.

When backing up from a standstill, if the truck wheels 34 skid, i.e., turn backwards, the shaft 29 is turned backwards more rapidly than normally allowed by the motor 43 (or 43a), which are governed in speed by the ground; thereby the motor 43 (or 43a) is driven backward by the pump 30, and backward power is applied to the trailer wheels 39. (In this connection, it may be noted that the pump and motor may be operated and driven either forwards or backwards, and that when backing up the transmission 25 drives the pump in reverse.) No reduction in the compression of the draw-bar (and, hence, no reduction in the tendency to jack-knifing) is, in this case, produced when the truck wheels do not skid; but jack-knifing can be avoided when backing up or the danger thereof reduced by decreasing the pump displacement and thereby causing an increase in the proportional power delivered to the trailer.

The method of driving a self-propelled vehicle means, including the application of power to the trailer only when the ratio of the speeds of the primary and secondary ground-engaging driving elements changes, and of driving the pump at a speed which has a fixed relation or ratio to the speed of the primary driving element (the truck wheels 34), as well as accommodating small differences in ground speeds, such as those due to a curvature of the path of the vehicle means, is inherent in the foregoing.

FOURTH EMBODIMENT

Figure 5:
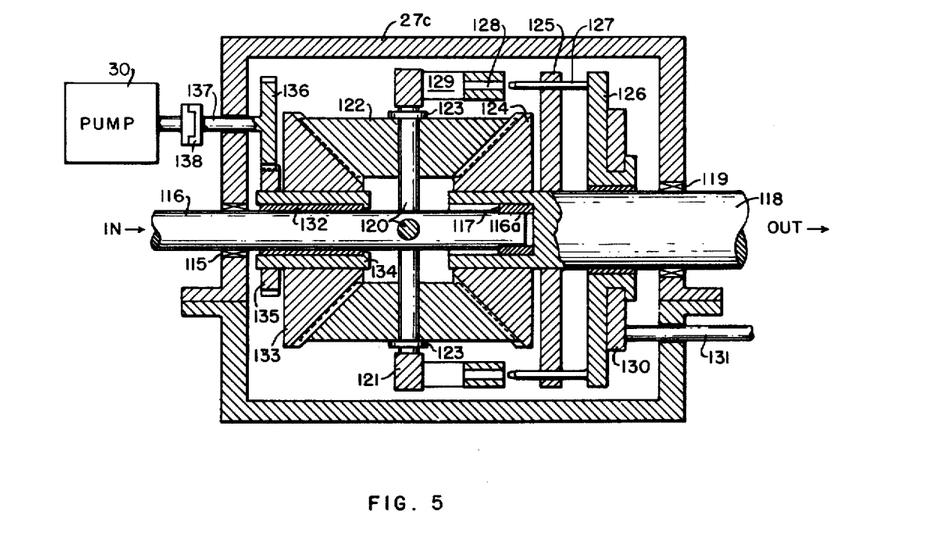
FIG. 5 is a longitudinal section through a differential torque divider according to a fourth embodiment.

Referring to FIG. 5, the torque divider may use bevel gears, e.g., of equal pitch diameters, whereby the outputs receive equal torques. In this embodiment, the divider includes a housing 27c, fast to the chassis 16 and having bearings 115 journalling an input shaft 116 which is coupled to the shaft 26 of FIG. 1. The inner end 116a of the input shaft is journalled in a bushing 117, e.g., of bronze, fixed within a counter-bore in a coaxial shaft 118 which is rotatably journalled to the housing by a bearing 119. This is the output shaft and is coupled drivingly to the shaft 28 to drive the truck.

The input shaft carries a plurality such as two to four, radial spindles 120 connected at their outer ends by a ring 121, this ring and the spindles constituting a planet carrier. Bevel planet gears 122 are freely rotatable on these spindles, secured by means such as washers 123. Fast to the output shaft 118 is a bevel gear 124 which meshes with the gears 122. The output shaft also carries for rotation therewith a fixed plate 125 and an axially shiftable plate 126 which carries pins 127 extending through holes in the former plate. The pins are located to enter holes 128 in a ring 129 that is fixed to the planet carrier ring 121. The plate 126 has a collar formed with a groove which contains the tines of a shift fork 130; this fork is fixed to the end of a control rod 131 which extends slidably through the housing. When this rod is pushed in (toward the left as seen in FIG. 5) the pins enter the holes to interlock the planet carrier (and, hence, the input shaft 116) to the coaxial output shaft 118.

Rotatably mounted on the input shaft 116 by a bushing 132 is a second bevel gear 133 meshing with the gears 122 and fast to a sleeve 134 which is the second output shaft and carries a ring gear 135. This gear meshes with a spur gear 136, fast to the shaft 137, which is journalled to the housing and is mechanically coupled to drive the input shaft of the pump 30 by a coupling unit 138.

It is understood that the housing 27c is attached to the chassis 16, replacing the previously-described torque dividers.

OPERATION OF FOURTH EMBODIMENT

Operation is as was previously described for the first embodiment, the control rod 131 being substituted for the rod 35; the by-pass valve 46 is advantageously used, and the motor clutch of FIG. 3 may be present. Equal torques are, however, applied to the two output shafts, and when a fixed or a variable displacement pump has a normal displacement relationship, equal powers are transmitted to the primary and secondary driving elements; similarly, equal powers are then transmitted from these elements to the power plant.

GENERAL

In the foregoing embodiments, when the displacement of a variable displacement pump is set to zero, the secondary driving element, e.g., the trailer wheels, are locked to stationary condition when the by-pass valve 46 is closed and the clutch 111 of FIG. 3 is not used or is engaged. As the pump displacement is increased to normal displacement the primary driving element, e.g., the truck wheels, receive a gradually increasing fraction of the power reaching, for example 60% in the first embodiment and 50% in the fourth; no such effect or differential action occurs in the third embodiment. Except in the third embodiment, the fraction of the power delivered to the pump decreases as the displacement is increased, whereby a degree of control can be achieved which cannot be achieved if the hydraulic train were replaced by a drive shaft, as in some four-wheel drive vehicle means.

I claim as my invention:

1. A method of driving a self-propelled vehicle means having primary and secondary ground-engaging driving elements situated on different transverse axes from a power plant on the vehicle means, which comprises applying power from the power plant to the primary driving element, driving a variable-displacement pump from said power plant through a power take-off unit, adjusting the displacement of said pump to balance approximately the pressures in duct means including supply and return ducts interconnecting said pump and a hydraulic motor which is coupled to drive the secondary driving element, said adjustment being valid when the vehicle means moves forwardly on straight road affording good traction, transmitting substantially no hydraulic power by flow of fluid through said duct means when the vehicle moves forwardly on straight road affording good traction, and transmitting hydraulic power by flow of fluid through said duct means between said pump and motor substantially only when the ratio of the speeds of the primary and secondary driving elements is altered.

2. Method according to claim 1 wherein said pump is driven under all conditions of operation at a rotary speed which has a fixed ratio to the speed of said primary driving element.

3. Method according to claim 1 wherein changes in the pressures within said duct means due to differences in the speeds of said primary and secondary driving elements upon curvature of the path of the vehicle means are accommodated by leaking hydraulic fluid from one of said duct means within the hydraulic motor, and the leaked fluid is returned to the duct means by an auxiliary pump.

4. In a self-propelled vehicle means having a power plant and primary and secondary ground-engaging elements situated on different transverse axes, a drive system which includes:
   a. means drivingly coupled to the primary driving element for driving said element from the power pland, a power take-off unit having an input drivenly coupled to said power plant, an output of said unit drivingly coupled to a variable displacement pump, the primary driving element and the pump being so interconnected that the ratio of the speeds of the primary driving element to that of the pump input shaft is fixed, a hydraulic motor drivingly coupled to the secondary driving element, and first and second duct means for interconnecting the pump and the motor for driving the motor from the pump, and
   b. means for varying the displacement of the pump to establish and maintain a desired fixed relationship between the pressures within said first and second duct means.

5. The combination according to claim 4 which includes an adjustable by-pass valve interconnected between said two duct means.

6. In combination with the elements according to claim 4, means for indicating to the operator of the vehicle means the relationship of the pressures within said first and second duct means, the said means for varying the displacement of the pump being manually controllable by the operator.

7. The combination according to claim 6 wherein said indicating means includes a pressure gage connected to each of said first and second duct means.

8. In combination with the elements according to claim 4, a transmission situated between the power plant and the input of the power take-off unit, for driving the primary driving element and the pump from said transmission.

9. The combination according to claim 4 wherein:
   a. said vehicle means is a truck-and-trailer combination, the primary driving element being truck wheels and the secondary driving element being trailer wheels, said combination including
   b. means for indicating to the operator of the vehicle means the relationship of the pressures within said first and second duct means, and
   c. a manually controllable by-pass valve interconnecting said first and second duct means by additional duct means, said by-pass valve being operable by said operator.

10. In a self-propelled vehicle means having a power plant and primary and secondary ground-engaging driving elements situated on different transverse axes, a drive system which includes;
 a. a differential torque dividing mechanism having an input shaft drivently coupled to said power plant, a first output shaft rotationally and drivingly coupled to said primary driving element, and a second output shaft rotationally and frivingly coupled to a hydraulic pump.
 b. said torque dividing mechanism comprising gear means for driving said output shafts differentially from the input shaft and including a rotatable planet carrier, planet gears means rotatably mounted on said carrier for rotation thereon and therewith and meshing with two gears of which on is fixed rotationally to a separate shaft, the carrier being fixed rotationally to said separate shaft which may be in input shaft,
 c. means for causing the input shaft and the first output shaft to rotate at approximately the same rotational speeds,
 d. clutch means including actuating mechanism therefore for engaging and disengaging the clutch means to selectively interconnect the input shaft to the first output shaft,
 e. a hydraulic motor drivingly coupled to said secondary driving element, and
 f. first and second duct means interconnecting the pump and the hydraulic motor for driving the motor hydraulically from the pump.

11. A self-propelled vehicle means according to claim 10 wherein said planet carrier is rotationally fixed to the input shaft and said planet gear means comprises one or more spur gears, said planet gear means meshing with both of the gears which are fixed rotationally to the two output shafts, one of said last-mentioned gears being an internal gear and the other being a sun gear.

12. A self-propelled vehicle means according to claim 10 wherein said planet carrier is rotationally fixed to the input shaft, the planet gear means and the two gears meshing therewith are bevel gears, said input shaft extends past one of said two bevel gears with free relative rotary motion, one of said meshing bevel gears is fixed to the first output shaft and the other is rotationally fixed to the second output shaft, the said input shaft carries radially extending means for driving said planet carrier situated between the said two meshing bevel gears, and the clutch means acts between the first output shaft and the planet carrier.

13. In a self-propelled vehicle means having a power plant and a plurality of ground-engaging driving elements situated on different transverse axes, a drive system which includes:
 a. a differential torque divider having an input shaft drivenly coupled to the power plant, two output shafts, and gear means for driving said output shafts differentially,
 b. means for coupling one of said output shafts mechanically to the driving element on one axis,
 c. a hydraulic motor drivingly coupled to the driving element on another axis,
 d. a pump coupled to the other of said output shafts,
 e. duct means continuously interconnecting the pump and the hydraulic motor under all conditions of operation for driving the motor from the pump and the pump from the motor.

14. The combination according to claim 13 wherein said vehicle means is a truck-and-trailer combination including a draw-bar pivotally connected to the truck for towing the trailer, said one axis being on the truck and the other axis and the hydraulic motor being on the trailer.

15. The combination according to claim 14 wherein the pump has a variable displacement and is mounted on the truck, said pump having means operable from the truck for changing the pump displacement, whereby the compressive force on the draw-bar can be reduced upon descent of a grade by reducing the pump displacement.

16. The combination according to claim 15 which includes a by-pass valve interconnecting said duct means and controllable from the truck.

17. The combination according to claim 14 wherein the trailer includes a differential gear drivingly coupled to a pair of trailer wheels constituting one of said driving elements and the hydraulic motor is coupled to drive the input of the differential gear.

18. The combination according to claim 13 wherein the differential torque divider has clutch means for selectively interconnecting the input shaft rotationally to said one output shaft, said vehicle means being a truck-and-trailer combination and said one axis being on the truck and the other being on the trailer.

19. In combination with the elements according to claim 18, a transmission situated between the power plant and the input shaft of the torque divider.

20. A vehicle means having a power plant and a plurality of ground-engaging driving elements situated on different transverse axes which includes a drive system having:
 a. a differential torque divider with an input shaft drivenly coupled to the power plant, a first output rotationally coupled to a pump, and a second output rotationally coupled to the driving element on one of said transverse axes by mechanical means, said torque divider including:
  1. gearing means for driving said outputs differentially from the input shaft having a rotatable planet carrier drivenly coupled to said input shaft,
  2. planet gear means rotatably mounted on said carrier for rotation thereon and therewith on axes parallel to and eccentric to the axis of the input shaft
  3. a sun gear rotably coupled to said first output and meshing internally with said planet gear means, and
  4. an internal gear rotatably coupled to said second output and meshing externally with said planet gear means,
 b. a hydraulic motor rotationally coupled to drive the driving element on the other of said transverse axes, and
 c. duct means interconnecting the pump and motor for driving the motor from the pump.

21. A self-propelled vehicle means according to claim 20 wherein the differential torque divider has clutch means for selectively interconnecting the input shaft rotationally to said second output.

22. A self-propelled vehicle means according to claim 20 wherein the said duct means continuously interconnect the pump and motor under all conditions of operation whereby both the pump can drive the motor and the motor can drive the pump.

\* \* \* \* \*